US011959623B2

(12) United States Patent
Ju et al.

(10) Patent No.: US 11,959,623 B2
(45) Date of Patent: Apr. 16, 2024

(54) CONNECTING DEVICE AND LAMP SYSTEM

(71) Applicant: Radiant Opto-Electronics Corporation, Kaohsiung (TW)

(72) Inventors: Chih-Hung Ju, Kaohsiung (TW); Cheng-Ang Chang, Kaohsiung (TW); Guo-Hao Huang, Kaohsiung (TW); Chung-Kuang Chen, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/308,651

(22) Filed: Apr. 27, 2023

(65) Prior Publication Data

US 2024/0068652 A1 Feb. 29, 2024

Related U.S. Application Data

(63) Continuation of application No. PCT/CN2022/121892, filed on Sep. 27, 2022.

(30) Foreign Application Priority Data

Aug. 23, 2022 (CN) ......................... 202211010124.9

(51) Int. Cl.
*F21V 23/06* (2006.01)
*F21S 2/00* (2016.01)

(52) U.S. Cl.
CPC .............. *F21V 23/06* (2013.01); *F21S 2/005* (2013.01)

(58) Field of Classification Search
CPC ......... F21S 2/005; F21V 23/06; F21V 21/005
See application file for complete search history.

(56) References Cited

U.S. PATENT DOCUMENTS

| | | | | |
|---|---|---|---|---|
| 3,840,842 A * | 10/1974 | Gabryelewicz | ......... | F21V 23/06 439/639 |
| 8,371,894 B1 * | 2/2013 | Rosen | .................. | A63H 33/108 446/485 |
| 10,527,263 B2 * | 1/2020 | Kalnins | ..................... | F21S 4/28 |
| 2005/0237769 A1 | 10/2005 | Hong | | |

(Continued)

FOREIGN PATENT DOCUMENTS

| | | |
|---|---|---|
| CN | 202915289 U | 5/2013 |
| CN | 203927808 U | 11/2014 |

(Continued)

*Primary Examiner* — Alexander K Garlen
(74) *Attorney, Agent, or Firm* — CKC & Partners Co., LLC

(57) ABSTRACT

The present disclosure provides a connecting device and a lamp system. The connecting device is used to connect multiple lamps to form the lamp system. The connecting device includes a connecting element, a cover, and a shell. The cover is mounted on the connecting element and includes at least two first assembling members. The shell is detachably mounted on the cover. The shell includes a side wall, an opening, multiple gateways, and at least two second assembling members. The side wall surrounds a space. The opening and the gateways all are formed on a top of the side wall and communicate with the space. A portion of each of the lamps is received in one of the gateways. The second assembling members are disposed on the side wall and face each other in a radial line of the shell, and respectively engage with the first assembling members.

11 Claims, 14 Drawing Sheets

(56) References Cited

U.S. PATENT DOCUMENTS

| | | | | |
|---|---|---|---|---|
| 2006/0084357 | A1* | 4/2006 | Rosen | A63H 33/107 446/91 |
| 2006/0291235 | A1 | 12/2006 | Hendrikus et al. | |
| 2015/0345765 | A1* | 12/2015 | Horst | F21V 31/005 362/362 |
| 2021/0254801 | A1 | 8/2021 | Ju et al. | |

FOREIGN PATENT DOCUMENTS

| | | | | | |
|---|---|---|---|---|---|
| CN | 105972563 | A | | 9/2016 | |
| CN | 106382524 | A | * | 2/2017 | F21S 4/00 |
| CN | 107120622 | A | | 9/2017 | |
| CN | 207453232 | U | | 6/2018 | |
| CN | 110319379 | A | | 10/2019 | |
| CN | 212323362 | U | | 1/2021 | |
| CN | 215982436 | U | | 3/2022 | |
| CN | 216716117 | U | | 6/2022 | |
| KR | 20140006160 | U | * | 12/2014 | |
| KR | 20160099226 | A | * | 8/2016 | |
| TW | 202212733 | A | | 4/2022 | |

* cited by examiner

CONNECTING DEVICE AND LAMP SYSTEM

RELATED APPLICATIONS

This application is a continuation application of International Application No. PCT/CN2022/121892 filed on Sep. 27, 2022, which claims priority to China Application Serial Number 202211010124.9, filed Aug. 23, 2022. The entire contents of each of which are incorporated by reference.

BACKGROUND

Field of Invention

The present disclosure relates to a lamp connecting technology, and more particularly to a connecting device and a lamp system.

Description of Related Art

Taking the lighting of a shopping mall or a wholesale store as an example, it usually sets up plural lamps continuously above aisles between the product shelves to provide sufficient lighting. However, each lamp needs to be provided with its own power supply, so that the cost of the lamp is high, and the aisles lighted by the lamps have a problem of uneven illumination area. Therefore, it is necessary to provide a connecting structure that can adapt to different illuminating environments. Lamps currently on the market can be connected through a conventional connecting device. It is needed to develop different types of the connecting devices for different connecting configuration to adapt to different illuminating environments. Therefore, the connecting devices have the disadvantages of poor commonality and poor variability. In addition, the different connecting devices require separate molds for development. Therefore, there are not only large mold costs on a development side, but also a large inventory cost on a sales side.

SUMMARY

Therefore, an objective of the present disclosure is to provide a connecting device, which can connect multiple lamps to form lamp systems with different connecting configuration to adapt to different illuminating environments.

According to the aforementioned objectives, the present disclosure provides a connecting device used to connect a plurality of lamps. The connecting device includes a connecting element, a cover, and a shell. The cover is mounted on the connecting element and includes at least two first assembling members. The shell is detachably mounted on the cover and includes a side wall, an opening, a plurality of gateways, and at least two second assembling members. The side wall surrounds to form a space. The opening is formed on a top portion of the shell and communicates with the space. The gateways are formed in the side wall and communicate with the space. A portion of each of the lamps is received in one of the gateways. The second assembling members are disposed on the side wall and are opposite to each other in a radial line of the shell. The cover closes the opening. The second assembling members of the shell respectively engage with the first assembling members of the cover.

According to one embodiment of the present disclosure, the cover includes a first surface and a second surface opposite to the first surface, and the second surface faces the connecting element. The side wall of the shell includes a flange. Each first assembling member of the cover includes a first limiting portion, and the first limiting portion is located on the first surface. Each second assembling member of the shell includes a second limiting portion. The first limiting portion and the second limiting portion engage with each other. The second surface of the cover abuts against the flange of the side wall.

According to one embodiment of the present disclosure, the second limiting portion includes an inclined guiding surface.

According to one embodiment of the present disclosure, each first assembling member further includes a first auxiliary locating portion, and the first auxiliary locating portion is located on the second surface. Each second assembling member of the shell further includes a second auxiliary locating portion, the second auxiliary locating portion is disposed on the flange of the side wall. The first auxiliary locating portion and the second auxiliary locating portion engage with each other, and the first auxiliary locating portion and the first limiting portion are respectively disposed at two sides of the radial line.

According to one embodiment of the present disclosure, the connecting device further includes at least one side cover, and the at least one side cover is mounted on the side wall. Each side cover is used to close one of the gateways.

According to one embodiment of the present disclosure, the side wall of the shell includes a flange. The shell further comprises a plurality of engaging grooves, and the engaging grooves are disposed on the flange of the side wall and are adjacent to the gateways respectively. Each side cover includes a plurality of protrusion members and at least one stopping plate. The protrusion members respectively engage with the engaging grooves. Each stopping plate corresponds to an edge of one of the gateways and abuts against a surface of the side wall.

According to one embodiment of the present disclosure, the gateways of the shell extend to a surface of the shell, which is opposite to the opening.

According to one embodiment of the present disclosure, the connecting element includes a body and a plurality of connecting wings. The body is located in the space. The connecting wings are formed on the body at an interval, and the connecting wings outwardly extend towards the different gateways respectively.

According to one embodiment of the present disclosure, the connecting device further includes an assembling element. The assembling element fixes the connecting element to the cover along an assembling direction. The connecting element includes at least one first locating portion. The first locating portion is disposed on a surface of the body and faces the cover. The cover includes at least one second locating portion. The second locating portion is disposed on a surface of the cover and faces the connecting element. The first locating portion and the second locating portion are mutually assembled to prevent the connecting element and the cover from relatively rotating or misaligning along the assembling direction.

According to one embodiment of the present disclosure, the side wall includes a contour, and the contour is a quadrilateral in a top view. The side wall includes four side surfaces and four corners. The number of the gateways is four, and the four gateways are respectively formed on the four side surfaces of the side wall. Each corner is located between adjacent two of the side surfaces, and the second assembling members are located on opposite two corners.

According to one embodiment of the present disclosure, the shell is moved along the assembling direction and is combined with the cover, and the radial line is perpendicular to the assembling direction.

According to the aforementioned objectives, the present disclosure provides a lamp system. The lamp system includes a plurality of lamps and the aforementioned connecting device. The connecting device is connected to the lamps through the connecting element. Each lamp passes through a corresponding one of the gateways.

The connecting element of the connecting device of the present disclosure is able to connect to plural lamps, and a portion of the lamps are received in the different gateways of the shell, thereby forming the lamp system with a connecting configuration in L-shaped, T-shaped or cross-shaped. It can be known that the connecting device has excellent commonality, also the variability of the connecting configuration is good, so as to satisfy a requirement of a multi-directional connecting configuration. Furthermore, the commonality of the connecting device is good, such that it can save mold costs and reduce development costs or inventory costs. In addition, the first assembling members and the second assembling members provide a snap-fit combination to enhance an assembling convenience of assembling the shell on the cover.

BRIEF DESCRIPTION OF THE DRAWINGS

In order to make the above and other objectives, features, advantages, and embodiments of the present disclosure more obvious, the accompanying drawings are described as follows.

DETAILED DESCRIPTION

Figure 1A:
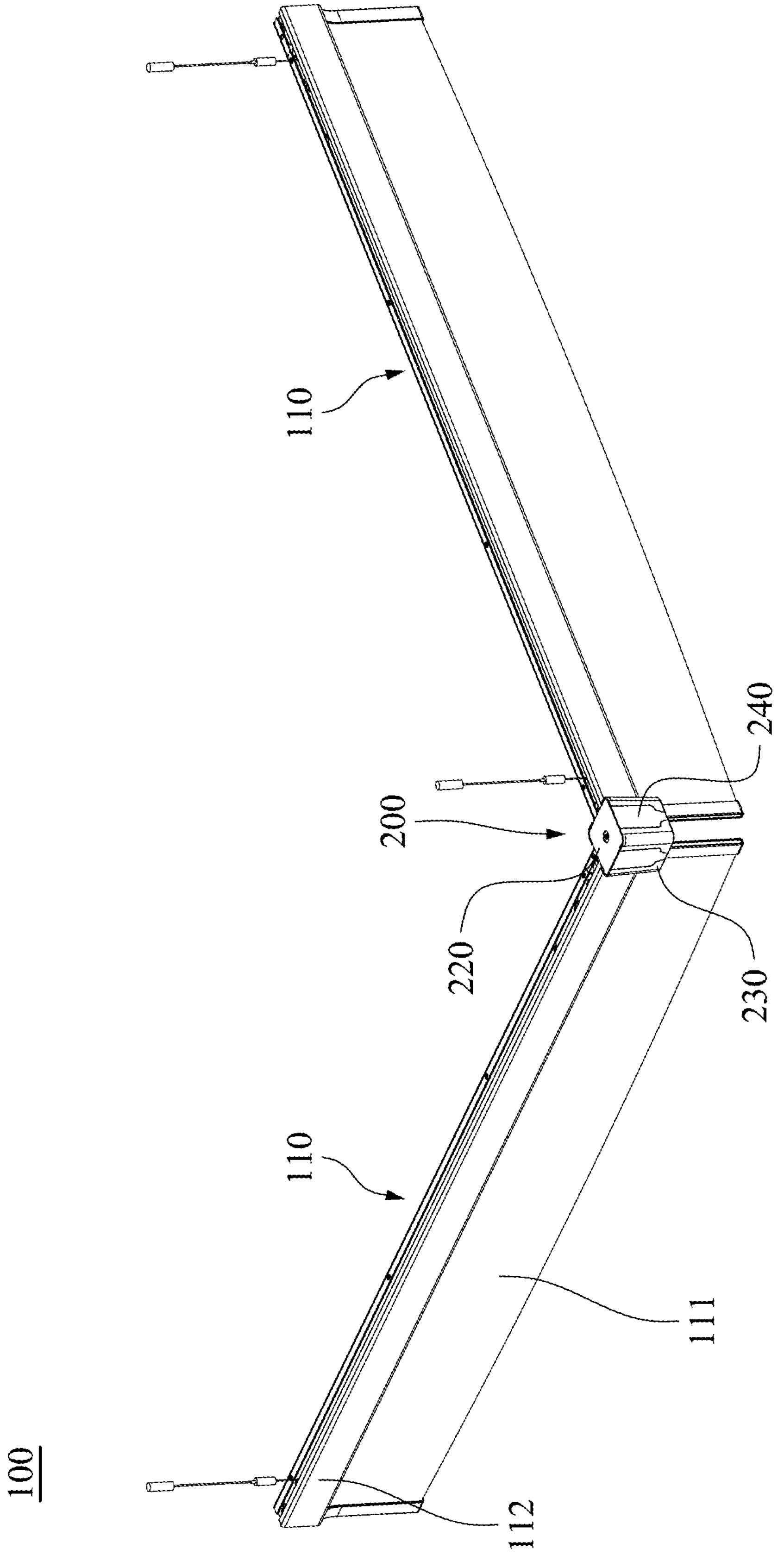
FIG. 1A, FIG. 1B, and FIG. 1C are respectively schematic three-dimensional assembly diagrams of lamp systems in accordance with some embodiment of the present disclosure.
Figure 1B:
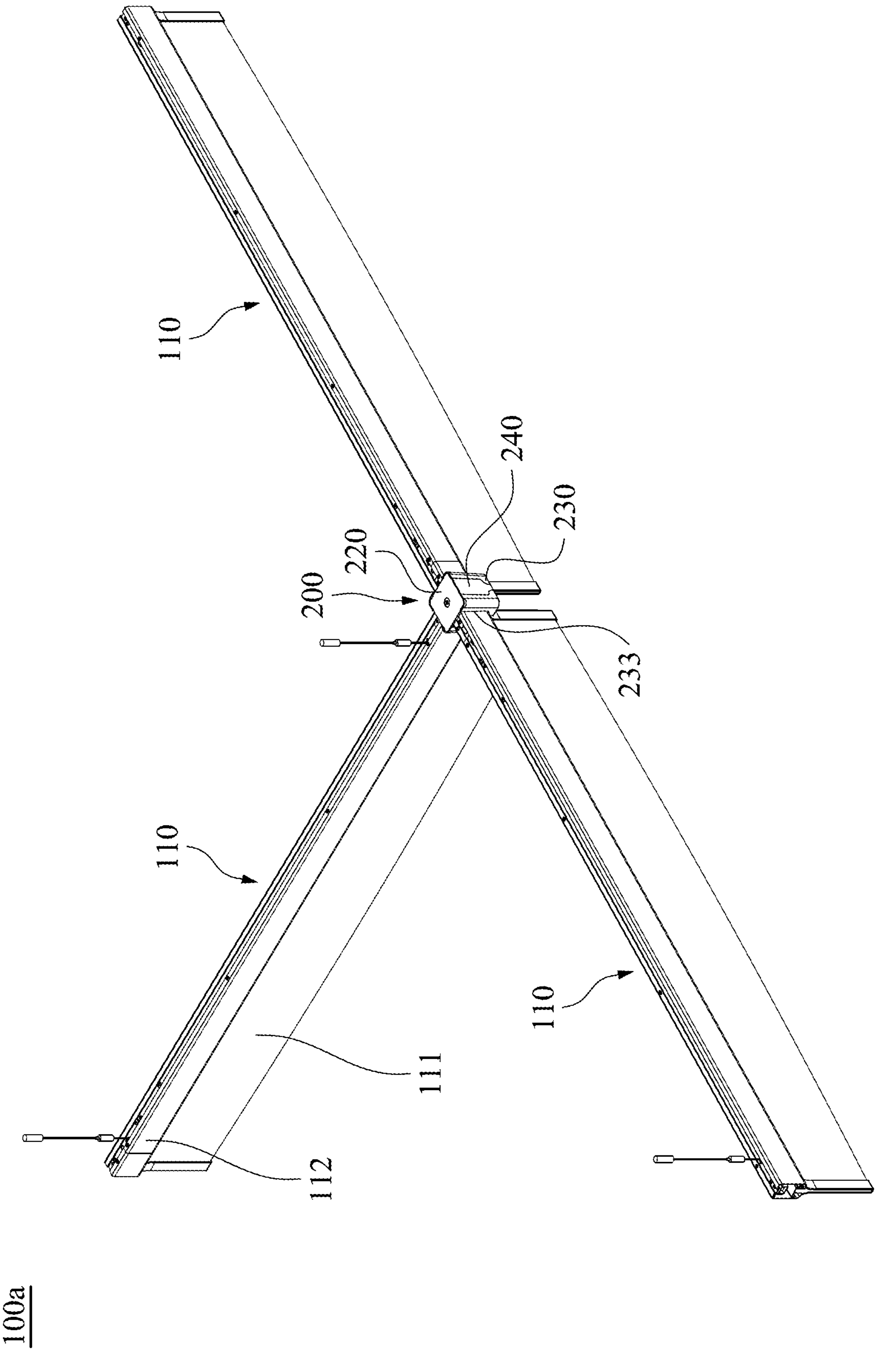
Figure 1C:
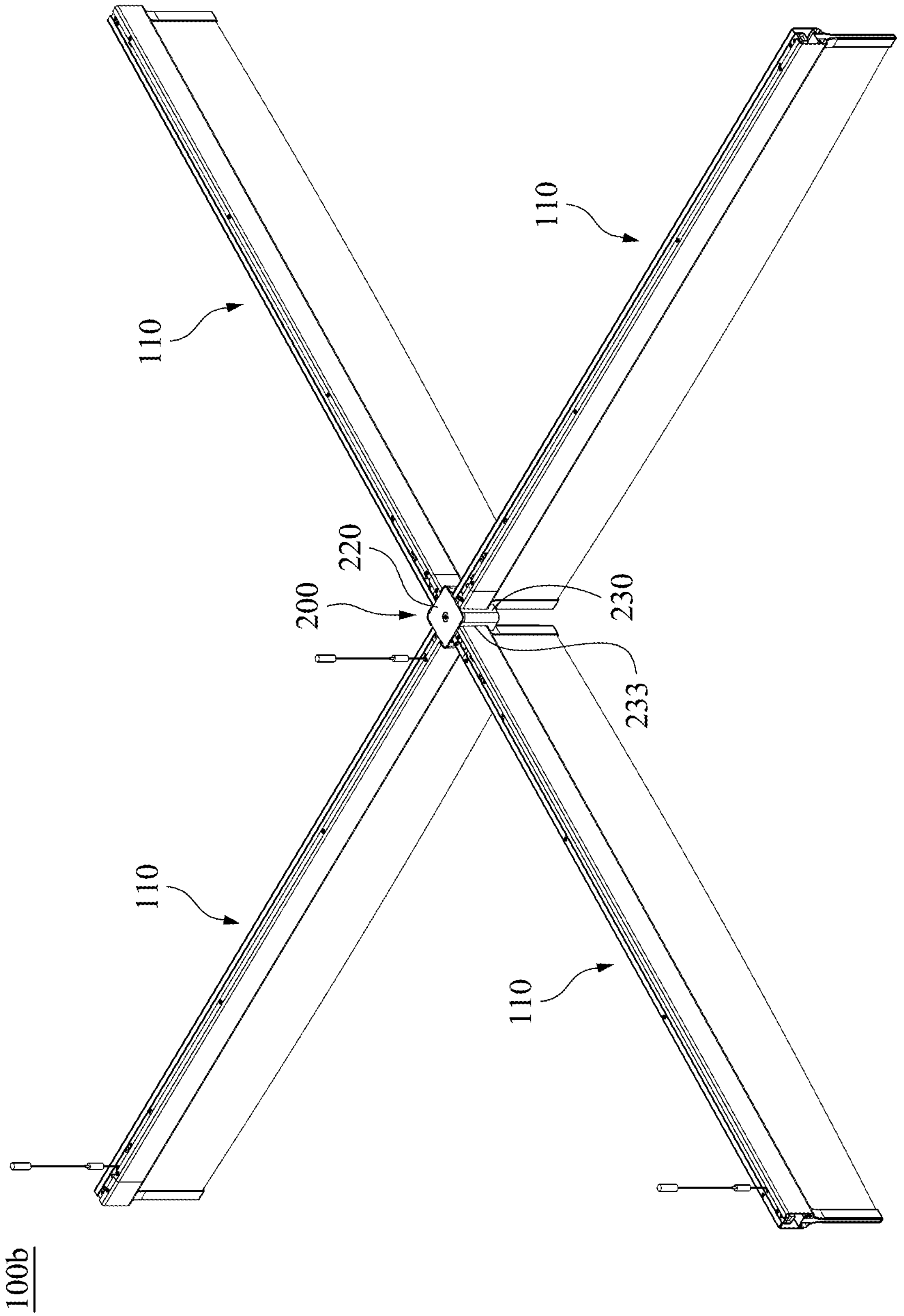

FIG. 1A, FIG. 1B, and FIG. 1C are respectively schematic three-dimensional assembly diagrams of lamp systems 100, 100*a* and 100*b* in accordance with some embodiment of the present disclosure. The lamp systems 100, 100*a* and 100*b* of the present disclosure include plural lamps 110 and a connecting device 200. The connecting device 200 is used to connect the lamps 110. After the lamps are connected by the connecting device 200, the lamps 100 extend in different directions. In one embodiment, the lamps 110 includes a light source 112 capable of emitting light and a light guide plate 111 for receiving light, so that the light emitted by the light source 112 is converted into a surface light source to provide an ambient illumination.

As shown in FIG. 1A, the number of the lamps 110 is two, and the number of the connecting device 200 is one. The connecting device 200 connects the two lamps 110 to form the lamp system 100 with an L-shaped connecting configuration. As shown in FIG. 1B, the number of the lamps 110 is three, and the number of the connecting device 200 is one. The connecting device 200 connects the three lamps 110 to form the lamp system 100*a* with a T-shaped connecting configuration. As shown in FIG. 1C, the number of the lamps 110 is four, and the number of the connecting device 200 is one. The connecting device 200 connects the four lamps 110 to form the lamp system 100 with a cross-shaped connecting configuration. The connecting device 200 can be applied to different connecting configuration of the lamp systems 100, 100*a* and 100*b*, so as to satisfy a requirement of a multi-directional connecting configuration.

The number of the lamps 110 connected by the connecting device 200 can be adjusted according to requirements, and the number of the lamps 110 is not limited to two, three or four. An included angle between two adjacent lamps 110 can be adjusted according to the requirements, such that the included angle between the two adjacent lamps 110 is not limited to 90 degrees or 180 degrees.

Figure 2A:
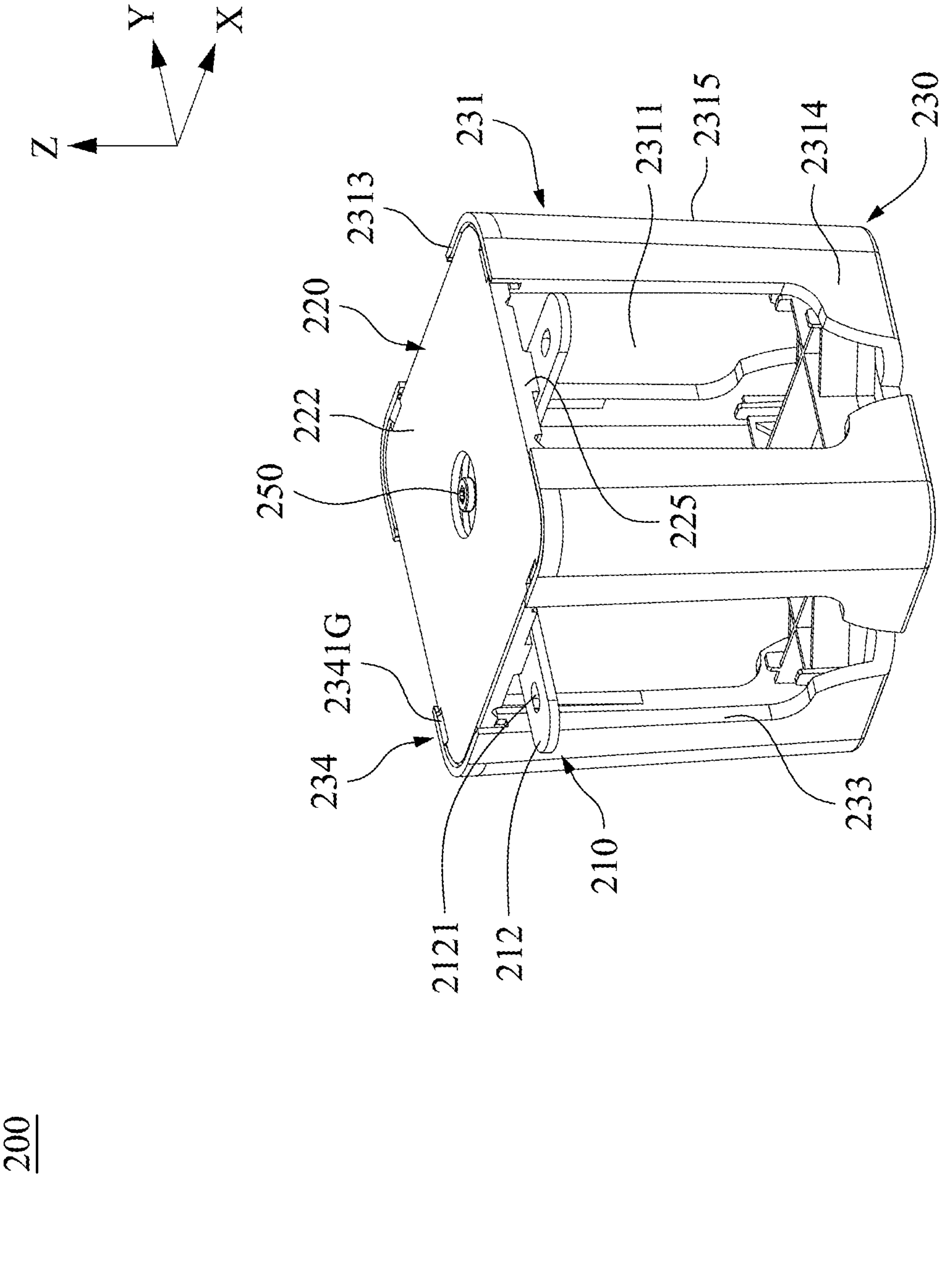
FIG. 2A and FIG. 2B are respectively schematic three-dimensional assembly diagram and schematic three-dimensional exploded diagram of a connecting device in accordance with an embodiment of the present disclosure.
Figure 2B:
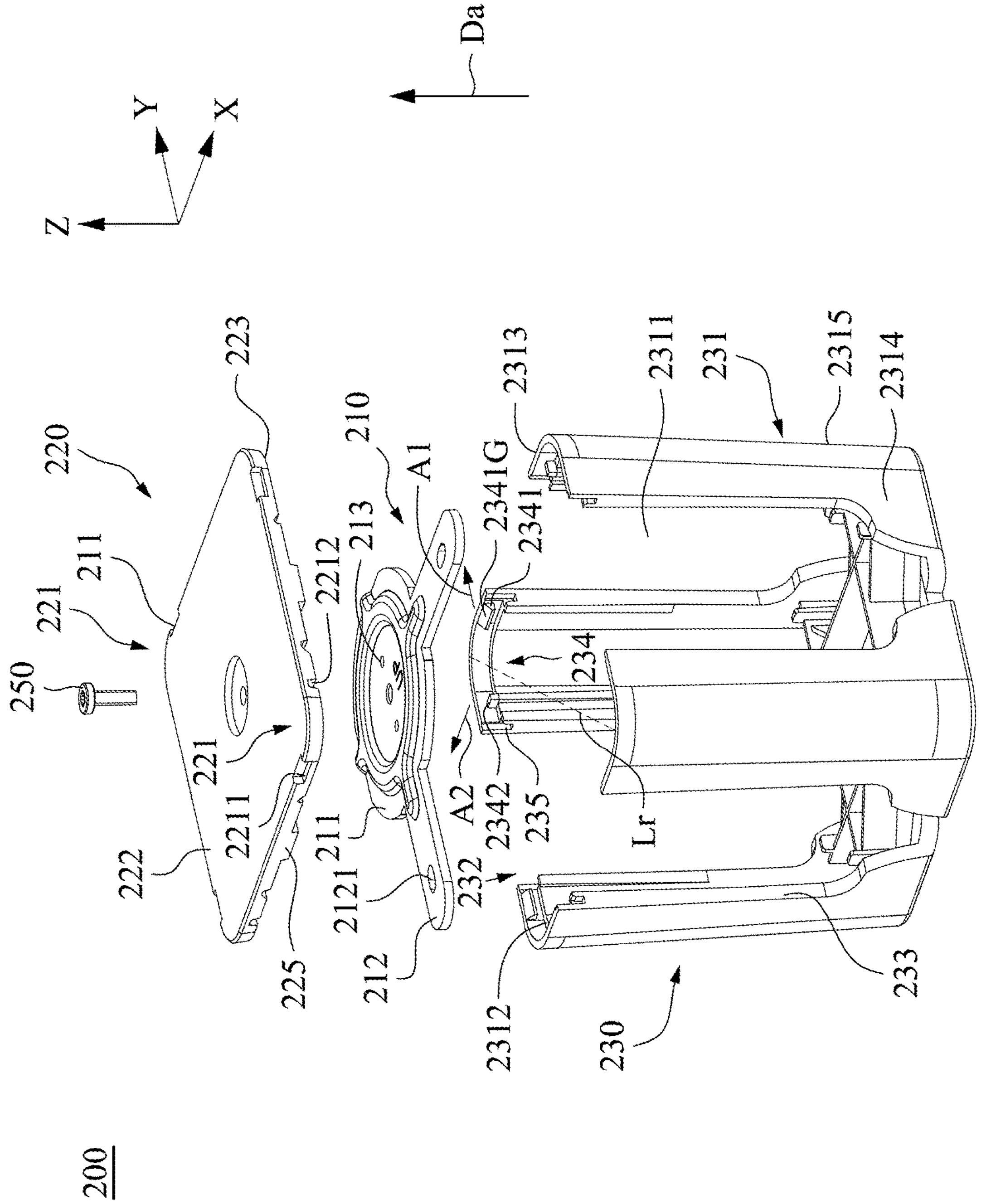

Referring to FIG. 2A and FIG. 2B, which are respectively schematic three-dimensional assembly diagram and schematic three-dimensional exploded diagram of the connecting device 200 in accordance with an embodiment of the present disclosure. The connecting device 200 may mainly include a connecting element 210, a cover 220 and a shell 230. The cover 220 is mounted on the connecting element 210, and the shell 230 is detachably mounted on the cover 220. At least one portion of each of the lamps 110 connected by the connecting device 200 can be received in the shell 230, and the cover 220 closes an opening 232 of the shell 230, such that the connecting device 200 can connect the lamps 110 to form the lamp systems 100, 100*a* and 100*b* with the different connecting configuration to adapt to different illuminating environments.

Figure 3:
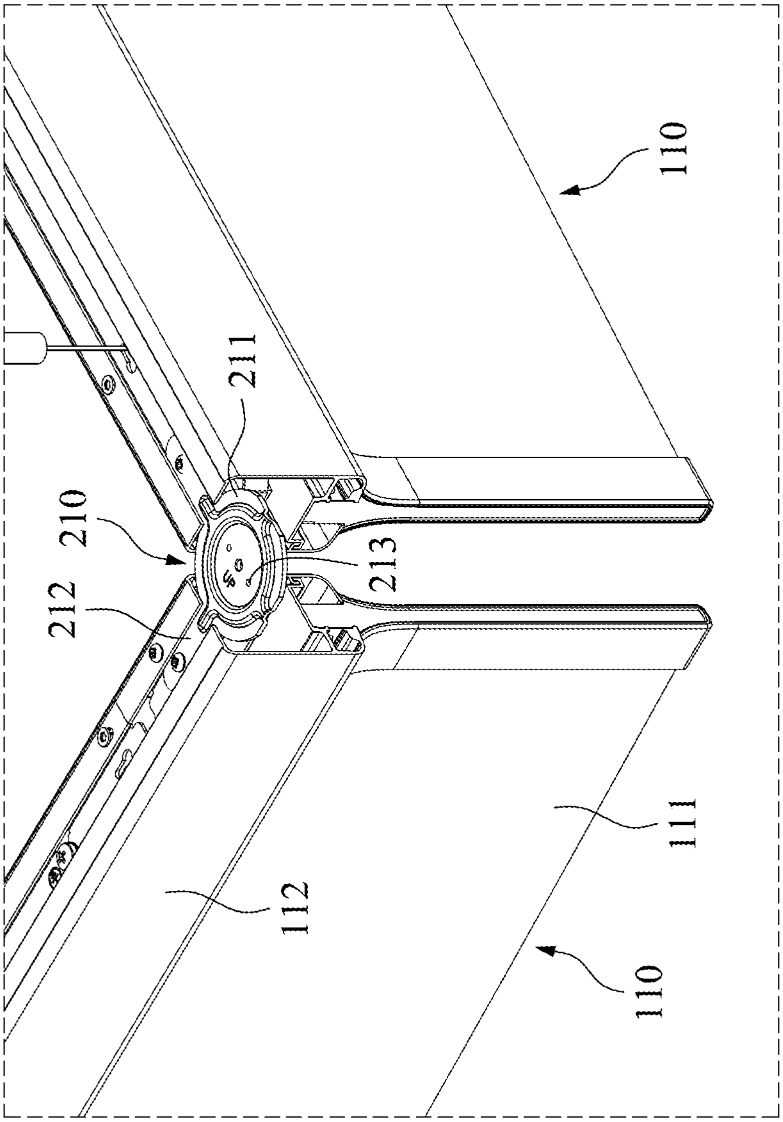
FIG. 3 is schematic three-dimensional assembly diagram of a connecting element connecting lamps in accordance with an embodiment of the present disclosure.

Referring to FIG. 3 together, which is a schematic three-dimensional assembly diagram of the connecting element 210 connecting the lamps 110 in accordance with an embodiment of the present disclosure. The connecting element 210 of the connecting device 200 is used to connect the lamps 110. As shown in FIG. 2B, the connecting element 210 includes a body 211 and connecting wings 212. The connecting wings 212 are formed on an outer edge of the body 211 at an interval, and the connecting wings 212 extend outwardly in different directions. There is a connecting hole 2121 formed on the connecting wing 212. In an assembling operation of connecting the lamp 110, a fastening element can be inserted into the connecting hole 2121 and screwed into the lamp 110, so as to assemble and fix the connecting wing 212 and the lamp 110. In an example, the connecting hole 2121 is an elongate hole for greater alignment tolerance between the connecting wing 212 and the lamp 110 and enhance an assembling convenience.

Figure 4A:
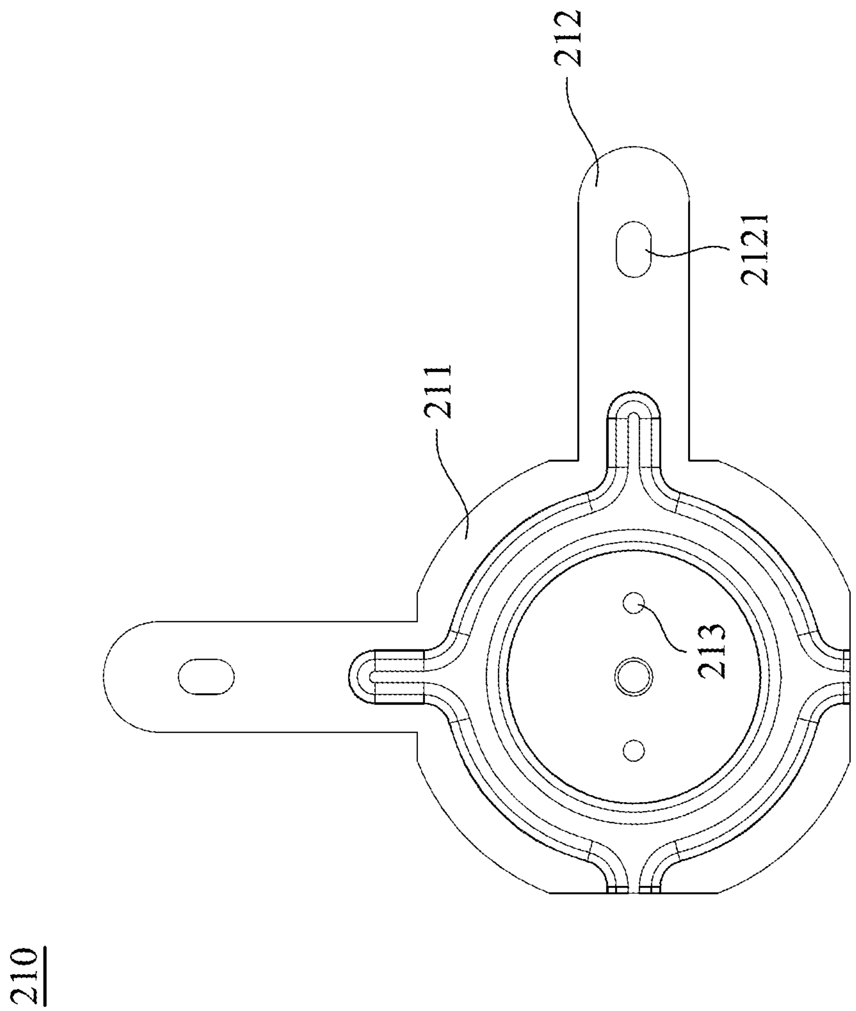
FIG. 4A, FIG. 4B and FIG. 4C are respectively schematic top view diagrams of connecting elements with L-shaped, T-shaped, and cross-shaped in accordance with some embodiments of the present disclosure.

In the embodiment as shown in FIG. 4A, two connecting wings 212 extend from the outer edge of the body 211, and an included angle between the two connecting wings 212 is 90 degrees to form an L-shaped connecting element 210, which is suitable for the lamp system 100 with the L-shaped connecting configuration as shown in FIG. 1A. In the embodiment shown in FIG. 4B, three connecting wings 212 extend from the outer edge of the body 211 to form a T-shaped connecting element 210*a*, which is suitable for the lamp system 100*a* with the T-shaped connecting configuration as shown in FIG. 1B. In the embodiment shown in FIG. 4C, four connecting wings 212 extend from the outer edge of the body 211, and the included angle between adjacent two of the connecting wings 212 is 90 degrees to form a cross-shaped connecting element 210*b*, which is suitable for the lamp system 100*b* with cross-shaped connecting configuration as shown in FIG. 1C. In an example, the number of the connecting wings 212 of the connecting element 210 is not limited to two, three or four, and the included angle between the adjacent two of the connecting wings 212 is not limited to 90 degrees or 180 degrees, so as to satisfy the requirement of the multi-directional connecting configuration.

Figure 4B:
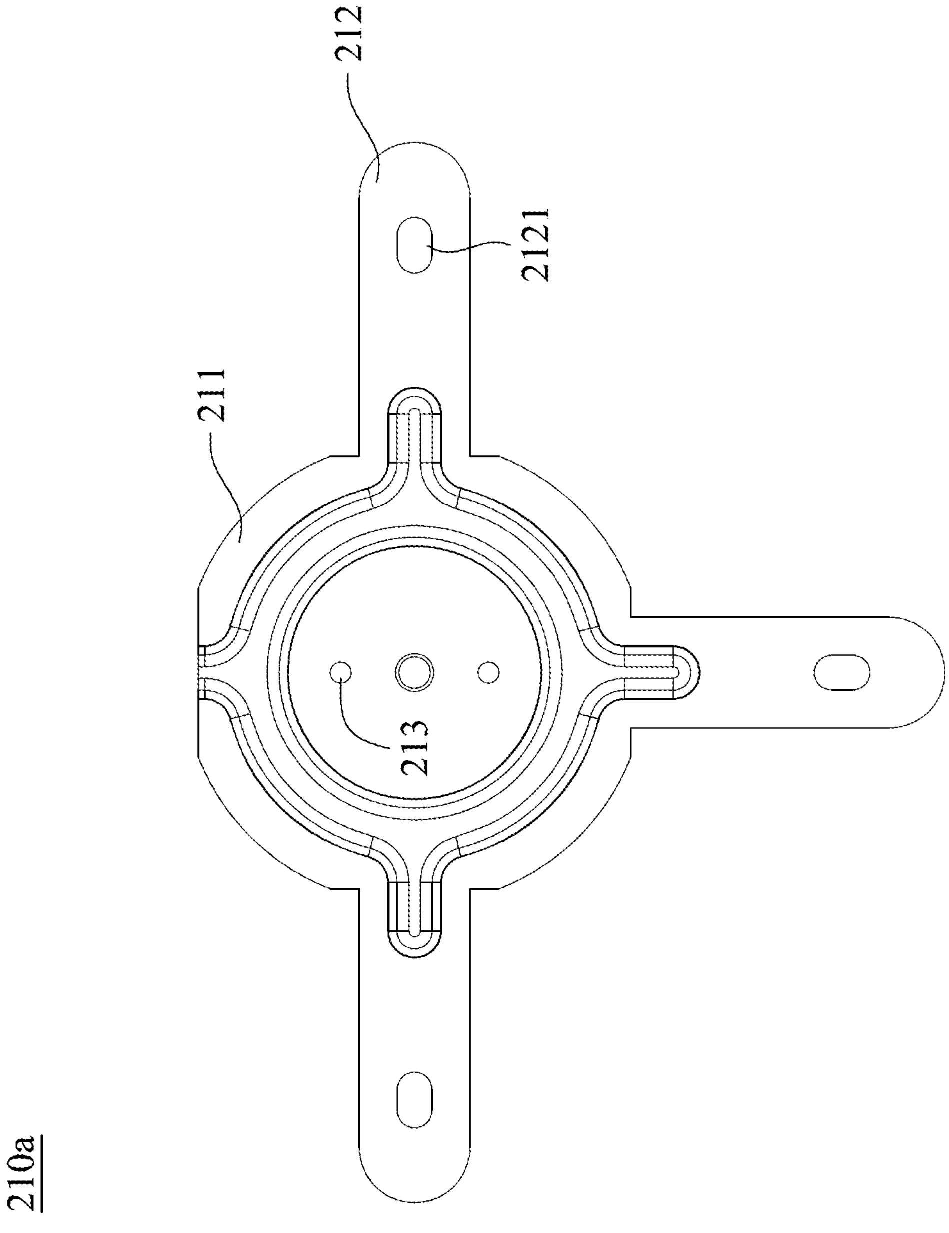
Figure 4C:
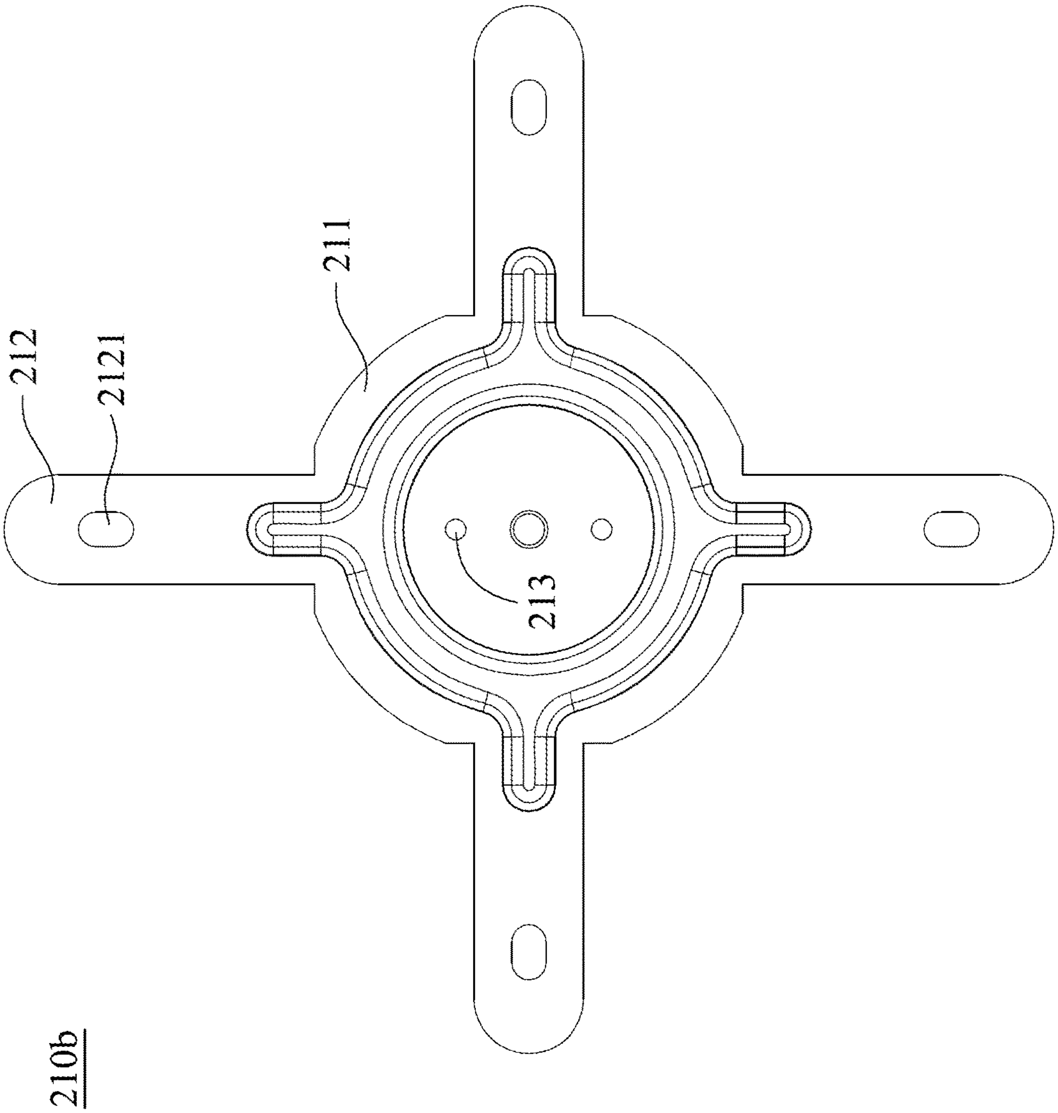

As shown in FIG. 4A to FIG. 4C, the difference between the connecting elements 210, 210*a* and 210*b* is only the number of the connecting wings 212. An adoption in molding development is the cross-shaped connecting element 210*b*, which with the largest number of the connecting wings 212. It can be achieved by punching and removing unnecessary connecting wings 212 in the cross-shaped connecting element 210*b* as shown in FIG. 4C for obtaining the T-shaped connecting element 210*a* or the L-shaped connecting element 210. That is, one of the connecting wings 212 of the cross-shaped connecting element 210*b* can be punched and removed to form the T-shaped connecting element 210*a*. The adjacent two of the connecting wings 212 of the cross-shaped connecting element 210*b* can be punched and removed to form the L-shaped connecting element 210. In other words, the L-shaped connecting element 210 as shown in FIG. 4A and the T-shaped connecting element 210*a* as shown in FIG. 4B can be further formed by the mold of the cross-shaped connecting element 210*b* as shown in FIG. 4C, and a process about punching and removing. It is not necessary to make the molds of the L-shaped connecting element 210 and the T-shaped connecting element 210*a*. Therefore, the connecting elements 210, 210*a* and 210*b* of the connecting device 200 have excellent commonality so as to reduce mold costs.

As shown in FIG. 2B and FIG. 4A, the connecting element 210 further includes a first locating portion 213, and the first locating portion 213 is disposed on a surface of the body 211. In an example, the number of the at least one first locating portion 213 may be two, but not limited thereto, and the first locating portions 213 are disposed on the surface of the body 211 at an interval. In an example, the first locating portion 213 is in a form of a hole, but not limited thereto.

Figure 5:
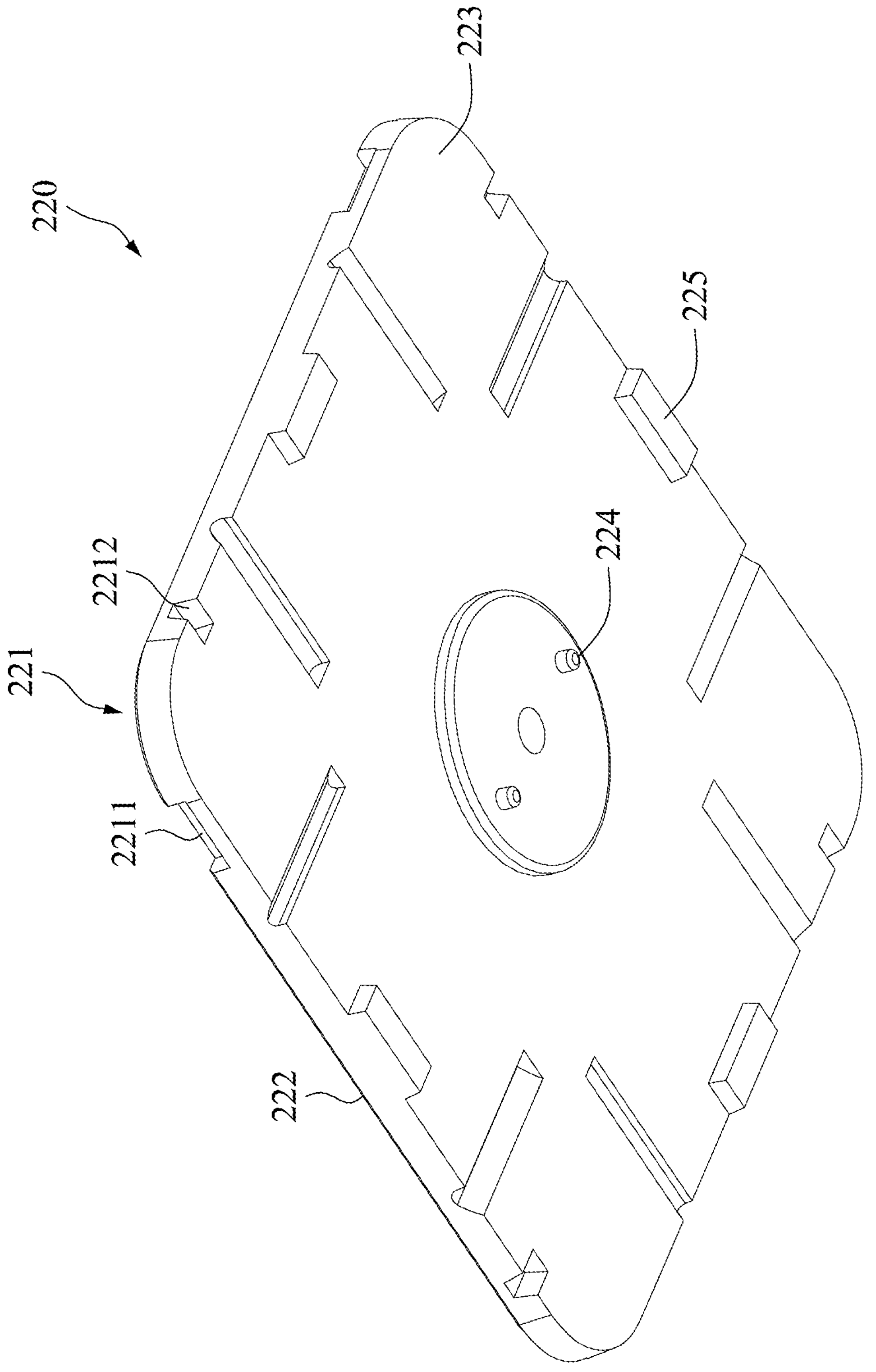
FIG. 5 is schematic three-dimensional assembly diagram of a cover in accordance with an embodiment of the present disclosure.

As shown in FIG. 2A, FIG. 2B and FIG. 5, the cover 220 is mounted on the connecting element 210. The cover 220 includes a first surface 222 and a second surface 223 opposite to each other, and the second surface 223 faces the connecting element 210. The cover 220 includes at least two first assembling members 221. In an example, the first assembling member 221 includes a first limiting portion 2211, and the first limiting portion 2211 is located on the first surface 222. In an example, the first assembling member 221 further includes a first auxiliary locating portion 2212, and the first auxiliary locating portion 2212 is located on the second surface 223.

In an example, the cover 220 further includes at least one second locating portion 224. The second locating portion 224 is disposed on a surface of the cover 220 and faces the connecting element 210. The first locating portion 213 of the connecting element 210 faces the cover 220. In an example, the second locating portion 224 is in a form of a bump, but not limited thereto. As shown in FIG. 2B and FIG. 5, the first locating portion 213 and the second locating portion 224 are assembled with each other, that is, when the cover 220 covers the body 211 of the connecting element 210, the second locating portion 224 of the cover 220 is inserted into the first locating portion 213 of the connecting element 210 to prevent the connecting element 210 and the cover 220 from relatively rotating or misaligning along an assembling direction Da. The misaligning in the present disclosure means that when the connecting element 210 extends to the gateway 233, it cannot be aligned with a corresponding combined portion of the lamp 110.

In an example, the cover 220 further includes locating protrusions 225 disposed at an interval. The locating protrusions 225 protrude from the second surface 223 of the cover 220.

As shown in FIG. 2A and FIG. 2B, the shell 230 is detachable mounted on the cover 220. The shell 230 moves along the assembling direction Da and is combined with the cover 220. The shell 230 includes a side wall 231, the opening 232, plural gateways 233 and at least two second assembling members 234. The side wall 231 surrounds to form a space 2311. The opening 232 is formed on a top portion of the shell 230 and communicates with the space 2311. The cover 220 closes the opening 232. The gateways 233 are formed in the side wall 231 and communicate with the space 2311. A portion of each lamp 110 is received in one of the gateways 233. The second assembling members 234 are disposed on the side wall 231 and opposite to each other along a radial line Lr of the shell 230. The radial line Lr is substantially perpendicular to the assembling direction Da. The second assembling members 234 of the shell 230 respectively engage with the first assembling members 221 of the cover 220.

In an example, the side wall 231 of the shell 230 includes a flange 2312. The flange 2312 is formed on an inner surface of the side wall 231, and the flange 2312 is adjacent to the opening 232. The flange 2312 further surrounds the space 2311, there is a distance between the flange 2312 and a top surface of the side wall 231, and the distance is not less than a thickness of the cover 220, so that the cover 220 can be received in the space 2311, that is, the cover 220 may not protrude from the top surface of the side wall 231. The second assembling member 231 includes a second limiting portion 2341. The second limiting portion 2341 is formed on the inner surface of the side wall 231, and the second limiting portion 2341 is located between the opening 232 and the flange 2312. The first limiting portion 2211 and the second limiting portion 2341 engage with each other to provide a limiting direction parallel to the assembling direction. The first limiting portion 2211 and the second limiting portion 2341 are an engaging structure with concave-convex fit. The second surface 223 of the cover 220 abuts against the flange 2312 of the side wall 231. In an example, the second limiting portion 2341 includes an inclined guiding surface 2341G, and the inclined guiding surface 2341G faces the opening 232. With the guiding of the inclined guiding surface 2341G, the second limiting portion 2341 of the shell 230 moves along an outer surface of the cover 220, and then the second limiting portion 2341 of the shell 230 engages with the first limiting portion 2211 of the cover 220. The inclined guiding surface 2341G facilitates assembly.

In an example, the second assembling member further includes a second auxiliary locating portion 2342, and the second auxiliary locating portion 2342 is disposed on the flange 2312 of the side wall 231. The first auxiliary locating portion 2212 and the second auxiliary locating portion 2342 engage with each other. The first auxiliary locating portion 2212 and the second auxiliary locating portion 2342 are an engaging structure with concave-convex fit. Due to a configuration of the first auxiliary locating portion 2212 and the second auxiliary locating portion 2342, the shell 230 and the cover 220 generate elastic deformation with a strong stress while engaged with each other. When the first auxiliary locating portion 2212 and the second auxiliary locating portion 2342 fit into each other, it makes a click sound in assembly, which is beneficial for an operator to aware whether the shell 230 and the cover 220 are assembled correctly in installation to enhance the assembling convenience.

In addition, a limiting direction provided by an engagement of the first auxiliary locating portion 2212 and the second auxiliary locating portion 2342 is different from the limiting direction provided by an engagement of the first limiting portion 2211 and the second limiting portion 2341. Therefore, the configuration of the first auxiliary locating portion 2212 and the second auxiliary locating portion 2342 enhances an engaging strength between the shell 230 and the cover 220, so that the shell 230 is not easily deformed by a force to separate from the cover 220. Therefore, it is difficult to separate the shell 230 and the cover 220 by bare hands, and the shell 230 can be detached from the cover 220 with a hand tool.

In an embodiment, in each first assembling member 221, the first auxiliary locating portion 2212 and the first limiting portion 2211 are respectively disposed at two sides of the radial line Lr. Similarly, in each second assembling member 234, the second auxiliary locating portion 2342 and the second limiting portion 2341 are respectively disposed at the two sides of the radial line Lr.

Taking the second assembling member 234 in FIG. 2B as an example, the second limiting portion 2341 is located at a right side of the radial line Lr, and the second auxiliary locating portion 2342 is located at a left side of the radial line Lr, whereby the second limiting portion 2341 and the second auxiliary locating portion 2342 respectively limit the cover 220 along an X direction and a Y direction. In other words, as the combination of the second limiting portion 2341 and the first limiting portion 2211, the second limiting portion 2341 may be limited in the X direction, but may detach along a direction indicated by an arrow A1. As the combination of the second auxiliary locating portion 2342 and the first auxiliary locating portion 2212, the second auxiliary locating portion 2342 may be limited in the Y direction, but may detach along a direction indicated by an arrow A2. Therefore, a purpose, that the limiting of the X direction and the Y direction at the same time, can be achieved by the second limiting portion 2341 and the second auxiliary locating portion 2342 of the second assembling member 234. On the other hand, though the second limiting portion 2341 is combined with the first limiting portion 2211 on the first surface 222, and the second auxiliary locating portion 2342 is combined with the first auxiliary locating portion 2212 on the second surface 223, the cover 220 can be limited in a Z direction. Combining the aforementioned limiting effects of the cover 220 and the shell 230 in the X direction, the Y direction and the Z direction, with a great engaging strength between the shell 230 and the cover 220, so the shell 230 is not easily deformed by a force via bare hands to separate from the cover 220. In other word, it needs the assistance of the hand tool to detach the shell 230 from the cover 220, which complies with international safety regulations.

In an example, the side wall 231 includes a contour 2313, and the contour 2313 may be in a geometric shape, such as a circle, a triangle, or a quadrangle, in a top view. The contour 2313 of the side wall 231 may also be in a non-geometric shape in the top view, and not limited by the example of the present disclosure. In an example, the side wall 231 can be a hollow column, such as a hollow cone, a hollow pyramid, a hollow triangular column, a hollow quadrangular column (cube) or a hollow cylinder, but not limited thereto.

In an example, the contour 2313 is a quadrilateral in a top view. The side wall 231 includes four side surfaces 2314 and four corners 2315. The number of the gateways 233 is four, and the four gateways 233 are respectively formed in the four side surfaces 2314 of the side wall 231. Each of the four corners 2315 is located between adjacent two of the four side surfaces 2314. In an example, the number of the second assembling members 234 is two, and the two assembling members 234 are located on two opposite corners 2315. In an example, the number of the second assembling members 234 is three, and the three assembling members 234 are located on three corners 2315. In an example, the number of the second assembling members 234 is four, and the four assembling members 234 are located on the four corners 2315. As the number of the second assembling members 234 increases, the number of the first assembling members 221 of the cover 220 also increases. By increasing the number of the engaged first assembling members 221 and second assembling members 234, the assembling strength of the shell 230 and the cover 220 can be improved.

In an example, the shell 230 further includes engaging grooves 235, and the engaging grooves 235 are disposed on the flange 2312 and adjacent to the gateways 233 respectively. In an example, the gateways 233 of the shell 230 further extend to a surface of the shell 230, which is opposite to the opening 232. That is, as shown in FIG. 2B, the opening 232 is located on a top surface of the shell 230, and the gateways 233 are located on the side surfaces 2314 and further extend to a bottom surface of the shell 230, so that the gateways 233 can receive portions of the light guide plates 111 of the lamps 110.

As shown in FIG. 2A and FIG. 2B, after assembling the connecting element 210 of the connecting device 200, the cover 220 and the shell 230, the body 211 of the connecting element 210 is located in the space 2311 of the shell 230. The connecting wings 212 of the connecting element 210 respectively and outwardly extend toward different gateways 233. As shown in FIG. 2A, the number of the connecting wings 212 is two, the two connecting wings 212 protrude out of two gateways 233 respectively.

Figure 6A:
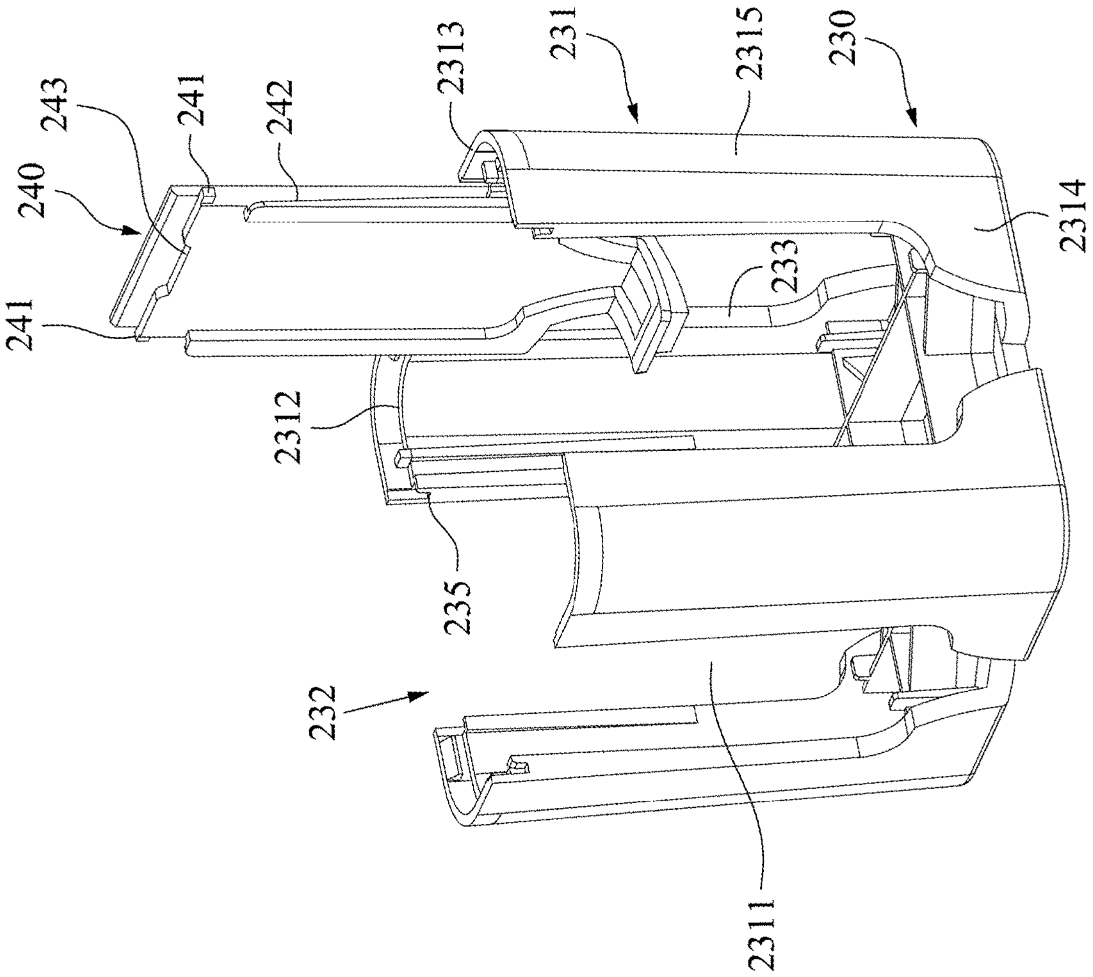
FIG. 6A and FIG. 6B are schematic three-dimensional diagrams respectively showing an incomplete assembly state and a complete assembly state of the shell and a side cover in accordance with an embodiment of the present disclosure.
Figure 6B:
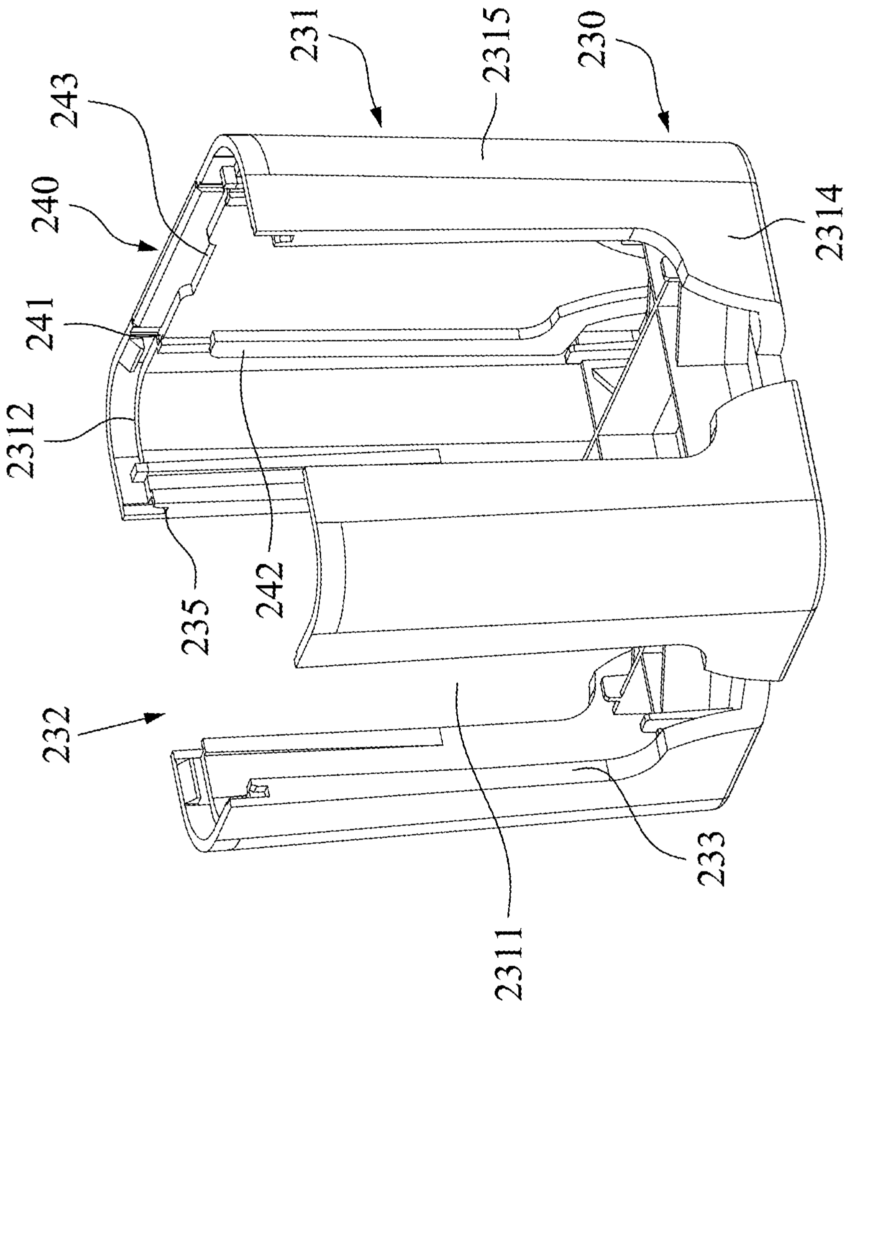

Referring to FIG. 6A and FIG. 6B, which are schematic three-dimensional diagrams respectively showing an incomplete assembly state and a complete assembly state of the shell 230 and a side cover 240 in accordance with an embodiment of the present disclosure. The connecting device 200 further includes at least one side cover 240. The side cover 240 is disposed on the side wall 231 and is used to close one of the gateways 233. The side cover 240 includes protrusion members 241 and at least one stopping plate 242. The protrusion members 241 engage with the corresponding engaging grooves 235 to ensure that the side cover 240 is inserted into the shell 230. The stopping plate 242 corresponds to an edge of the gateway 233 and abuts against a surface of the side wall 231. A locating stage 243 is formed on a surface of the side cover 240, which is adjacent to the flange 2312 of the shell 230. The locating protrusion 225 of the cover 220 can abut against the locating stage 243 of the side cover 240, and the stopping plate 242 abuts against the surface of the side wall 231, so that the side cover 240 is firmly positioned on the shell 230 for preventing the leakage of light from the gateways 233.

As shown in FIG. 2A and FIG. 2B, the connecting device 200 further includes an assembling element 250, and the assembling element 250 fixes the connecting element 210 to the cover 220 along the assembling direction Da. In a process of combining the connecting element 210 and the cover 220 with the connecting element 210, through a mutual assembly of the first locating portion 213 of the connecting element 210 and the second locating portion 224 of the cover 220, the connecting element 210 and the cover 220 will not be relatively rotated or misaligned along the assembling direction Da, so that the assembling element 250 can opportunely fix the connecting element 210 and the cover 220.

Figure 7:
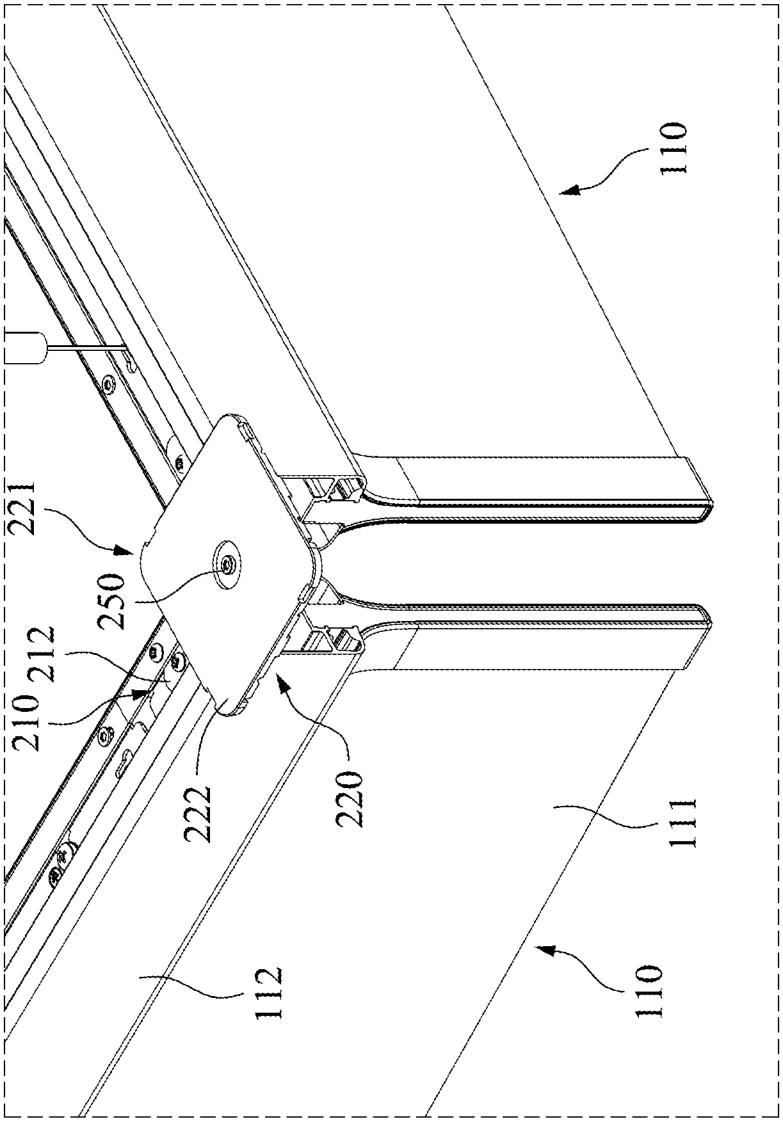
FIG. 7 is schematic three-dimensional assembly diagram showing the cover disposed on the connecting element in accordance with an embodiment of the present disclosure.
Figure 8:
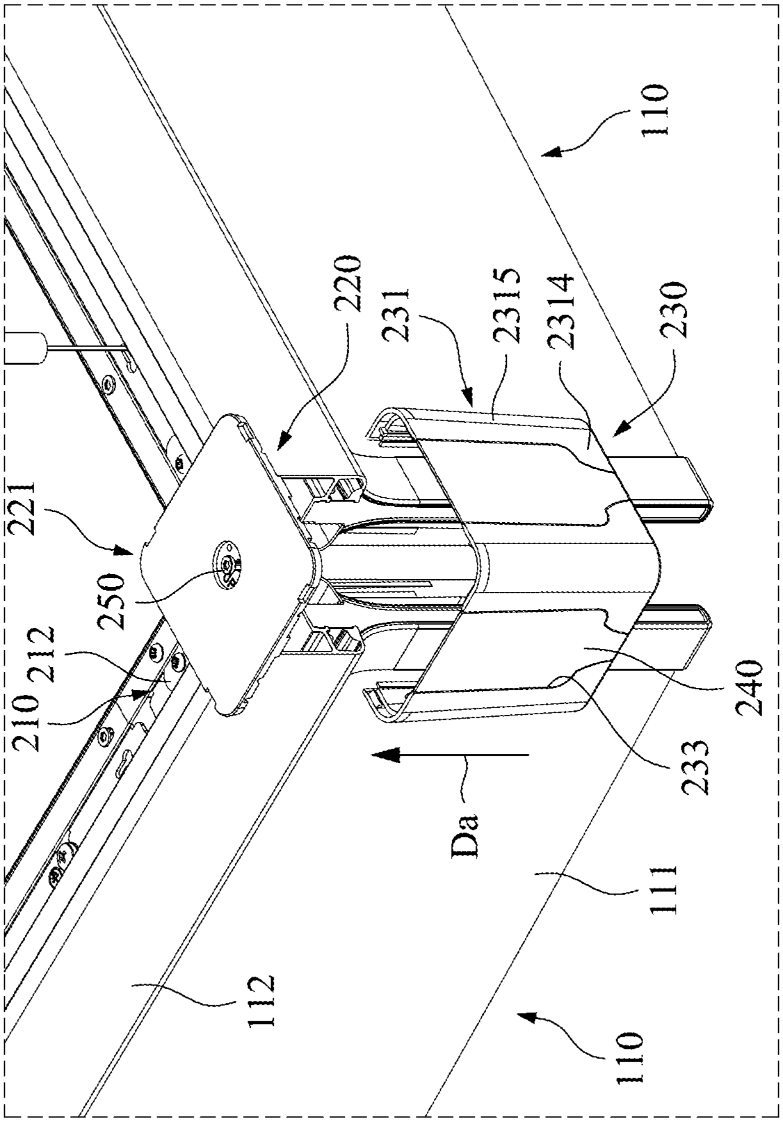
FIG. 8 is schematic three-dimensional diagram showing the shell moving along an assembling direction to engage with the cover in accordance with an embodiment of the present disclosure.

As shown in FIG. 3, the connecting wings 212 of the connecting element 210 are assembled with the lamps 110. After the lamps 110 are connected and fixed by the connecting element 210, the power cords between the lamps 110 are connected. As shown in FIG. 7, the cover 220 is disposed on the connecting element 210, and the cover 220 is further fixed on the connecting element 210 by the assembling element 250. As shown in FIG. 1A and FIG. 8, taking the connection of two lamps 110 as an example, the operator can take the two side covers 240 firstly. The side covers 240 are respectively inserted into the gateways 233 of the shell 230 to close the gateways 233 without the lamps 110 by the side covers 240. After the side cover 240 is inserted and assembled, the shell 230 is moved toward the cover 220 along the assembling direction Da.

As shown in FIG. 2B and FIG. 8, the operator can apply a force to engage the shell 230 with the cover 220, and the operator can aware the complete engagement state of the shell 230 and the cover 220 through click sounds of the first auxiliary locating portions 2212 and the second auxiliary locating portions 2342 fit into each other. In more detail, the shell 230 is moved toward the cover 220 along the assembling direction Da, that is, the shell 230 is moved toward the light source 112 of the lamp 110 along the light guide plate 111 of the lamp 110. An option of the relative assembly position of the cover 220 and the shell 230 may be that the cover 220 is located above the shell 230, but it is not limited thereto. In an example, the other option of the relative assembly position of the cover 220 and the shell 230 may also be reversed, that is, the shell 230 is located above the cover 220.

As shown in FIG. 1B, taking the connection of three lamps 110 as an example, the operator takes one side cover 240, and the side cover 240 is inserted into one of the gateways 233 of the shell 230, and the other gateways 233, that are not closed by the side covers 240, can accommodate portions of the corresponding lamps 110. Accordingly, the side cover 240 can be used to close the gateway 233 which does not accommodate lamp 110, so that after the connecting device 200 is connected to the lamps 110, the wires connected between the lamps 110 are unexposed, so the side cover 240 can not only provide a protection function to comply with safety regulations, but also achieve the purposes of dustproof and fine exterior.

As shown in FIG. 1C, taking the connecting of four lamps 110 as an example, the operator does not need to take the side cover 240, the shell 230 engages with the cover 220 directly, and portions of the four lamps 110 are respectively accommodated in the four gateways 233 of the shell 230. Therefore, the shell 230 is generic for the lamp systems 100, 100*a* or 100*b* in L-shaped, T-shaped or cross-shaped. Therefore, for the lamp systems 100, 100*a* and 100*b* with different connecting configurations, it is unnecessary to form molds of different shells 230. Thus, the shell 230 has good commonality, and can reduce the mold costs and the inventory costs.

It is known from the aforementioned embodiments, one of the advantages of the present disclosure is that the connecting device has good commonality and can be applied to lamp systems with different connecting configurations, so that the variability of the connecting configuration is good to satisfy the requirement of the multi-directional connecting configuration, and can adapt to different illuminating environments, such as continuous lighting above an aisle of a store. Since the connecting device has good commonality, it can save mold costs and achieve the purpose of reducing the costs. In addition, the commonality of the connecting device is good, so the connecting device used in the lamp systems with different connecting configurations is consistent, which can improve overall exterior of the lamp systems.

Another advantage of the present disclosure is to enhance an assembling convenience of assembling the shell on the cover. It is because that the present disclosure adopts the engagement of the first limiting portion and the second limiting portion, and further uses the engagement of the first auxiliary locating portion and the second auxiliary locating portion as an auxiliary, such that the shell engages with the cover without any fastening element, so the assembly between the shell and the cover is more fast and convenient.

Although the present disclosure has been disclosed above with embodiments, it is not intended to limit the present disclosure. Any person having ordinary skill in the art can make various changes and modifications without departing from the spirit and scope of the present disclosure. Therefore, the protection scope of the present disclosure should be defined by the scope of the appended claims.

What is claimed is:

1. A connecting device, which is used to connect a plurality of lamps, and the connecting device comprising:

a connecting element;

a cover mounted on the connecting element, the cover having at least two first assembling members; and a shell detachably mounted on the cover, and the shell comprising:

- a side wall surrounding to form a space;
- an opening formed on a top portion of the shell and communicating with the space;
- a plurality of gateways formed in the side wall and communicating with the space, and a portion of each of the lamps received in one of the gateways; and
- at least two second assembling members disposed on the side wall and opposite to each other in a radial line of the shell;

wherein the cover closes the opening, and the at least two second assembling members of the shell respectively engage with the at least two first assembling members of the cover.

2. The connecting device of claim 1, wherein the cover comprises a first surface and a second surface opposite to the first surface, and the second surface faces the connecting element; and the side wall of the shell comprises a flange;

wherein each of the at least two first assembling members of the cover comprises a first limiting portion, and the first limiting portion is located on the first surface;

wherein each of the at least two second assembling members of the shell comprises a second limiting portion, the first limiting portion and the second limiting portion engage with each other, and the second surface of the cover abuts against the flange of the side wall.

3. The connecting device of claim 2, wherein the second limiting portion comprises an inclined guiding surface.

4. The connecting device of claim 2, wherein each of the at least two first assembling members further comprises a first auxiliary locating portion, and the first auxiliary locating portion is located on the second surface; and each of the at least two second assembling members of the shell further comprises a second auxiliary locating portion, the second auxiliary locating portion is disposed on the flange of the side wall, the first auxiliary locating portion and the second auxiliary locating portion engage with each other, and the first auxiliary locating portion and the first limiting portion are respectively disposed at two sides of the radial line.

5. The connecting device of claim 1, wherein the side wall of the shell comprises a flange, and the shell further comprises a plurality of engaging grooves, and the engaging grooves are disposed on the flange of the side wall and are adjacent to the gateways respectively; and each of the at least one side cover comprises:

a plurality of protrusion members respectively engaging with the engaging grooves; and at least one stopping plate corresponding to an edge of one of the gateways and abutting against a surface of the side wall.

6. The connecting device of claim 1, wherein the gateways of the shell extend to a surface of the shell, which is opposite to the opening.

7. The connecting device of claim 1, wherein the connecting element comprises:

a body located in the space; and a plurality of connecting wings formed on the body at an interval, and outwardly extending towards the different gateways respectively.

8. The connecting device of claim 7, wherein the connecting device further comprises an assembling element fixing the connecting element to the cover along an assembling direction; wherein the connecting element comprises at least one first locating portion disposed on a surface of the body and facing the cover;

wherein the cover comprises at least one second locating portion disposed on a surface of the cover and facing the connecting element;

wherein the at least one first locating portion and the at least one second locating portion are mutually assembled to prevent the connecting element and the cover from relatively rotating or misaligning along the assembling direction.

9. The connecting device of claim 1, wherein the side wall comprises:

a contour being a quadrilateral in a top view;

four side surfaces; and four corners; and wherein the number of the gateways is four, and the four gateways are respectively formed on the four side surfaces of the side wall;

wherein each of the four corners is located between adjacent two of the four side surfaces, and the at least two second assembling members are located on opposite two of the four corners.

10. The connecting device of claim 1, wherein the shell is moved along an assembling direction and is combined with the cover, and the radial line is perpendicular to the assembling direction.

11. A lamp system, comprising:

a plurality of lamps; and the connecting device of claim 1, the connecting device connected to the lamps through the connecting element, and each of the lamps passing through a corresponding one of the gateways.

* * * * *